(12) United States Patent
Thomas et al.

(10) Patent No.: US 11,183,194 B2
(45) Date of Patent: Nov. 23, 2021

(54) DETECTING AND RECOVERING OUT-OF-VOCABULARY WORDS IN VOICE-TO-TEXT TRANSCRIPTION SYSTEMS

(71) Applicant: International Business Machines Corporation, Armonk, NY (US)

(72) Inventors: Samuel Thomas, White Plains, NY (US); Kartik Audhkhasi, White Plains, NY (US); Zoltan Tueske, White Plains, NY (US); Yinghui Huang, New York, NY (US); Michael Alan Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/570,876

(22) Filed: Sep. 13, 2019

(65) Prior Publication Data

US 2021/0082437 A1 Mar. 18, 2021

(51) Int. Cl.
*G10L 15/26* (2006.01)
*G10L 15/22* (2006.01)
(Continued)

(52) U.S. Cl.
CPC .............. *G10L 15/26* (2013.01); *G10L 15/16* (2013.01); *G10L 15/1815* (2013.01); *G10L 15/22* (2013.01); *G10L 2015/088* (2013.01)

(58) Field of Classification Search
None
See application file for complete search history.

(56) References Cited

U.S. PATENT DOCUMENTS 6,539,353 B1 * 3/2003 Jiang ...................... G10L 15/142
704/252
6,912,499 B1 * 6/2005 Sabourin ............... G10L 15/063
704/243
(Continued)

FOREIGN PATENT DOCUMENTS

| CN | 107660303 A | 2/2018 |
|---|---|---|
| CN | 109313896 A | 2/2019 |
| EP | 2608196 A1 | 6/2013 |

OTHER PUBLICATIONS

PCT Notification of Transmittal of the International Search Report and the Written Opinion of the International Searching Authority, or the Declaration for Application PCT/IB2020/058414 dated Dec. 16, 2020.

(Continued)

*Primary Examiner* — Neeraj Sharma
(74) *Attorney, Agent, or Firm* — Patterson + Sheridan, LLP (57) ABSTRACT

Aspects of the present disclosure describe techniques for identifying and recovering out-of-vocabulary words in transcripts of a voice data recording using word recognition models and word sub-unit recognition models. An example method generally includes receiving a voice data recording for transcription into a textual representation of the voice data recording. The voice data recording is transcribed into the textual representation using a word recognition model. An unknown word is identified in the textual representation, and the unknown word is reconstructed based on recognition of sub-units of the unknown word generated by a sub-unit recognition model. The textual representation of the voice data recording is modified by replacing the unknown word with the reconstruction of the unknown word, and the modified textual representation is output.

13 Claims, 5 Drawing Sheets

(51) Int. Cl.
*G10L 15/18* (2013.01)
*G10L 15/16* (2006.01)
*G10L 15/08* (2006.01)

(56) References Cited

U.S. PATENT DOCUMENTS

| | | | |
|---|---|---|---|
| 6,925,436 B1 | 8/2005 | Franz et al. | |
| 7,890,325 B2 | 2/2011 | Liu et al. | |
| 9,047,268 B2* | 6/2015 | Ouyang | G06F 3/04886 |
| 9,292,489 B1 | 3/2016 | Sak et al. | |
| 9,697,827 B1* | 7/2017 | Lilly | G10L 15/14 |
| 9,774,747 B2* | 9/2017 | Garland | H04M 11/10 |
| 10,290,301 B2 | 5/2019 | Lev-Tov et al. | |
| 10,380,242 B2* | 8/2019 | Minnis | G06F 40/242 |
| 2002/0013706 A1* | 1/2002 | Profio | G10L 15/22 |
| | | | 704/254 |
| 2003/0110032 A1* | 6/2003 | Seide | G10L 15/083 |
| | | | 704/240 |
| 2008/0162128 A1* | 7/2008 | Cheng | G10L 15/148 |
| | | | 704/231 |
| 2008/0221893 A1* | 9/2008 | Kaiser | G09B 19/04 |
| | | | 704/257 |
| 2009/0030894 A1* | 1/2009 | Mamou | G06F 16/3343 |
| 2015/0228272 A1* | 8/2015 | Gupta | G10L 15/14 |
| | | | 704/235 |
| 2016/0171973 A1* | 6/2016 | Nissan | G10L 15/183 |
| | | | 704/244 |
| 2016/0365093 A1 | 12/2016 | Nissan | |
| 2017/0076718 A1* | 3/2017 | Popovici | G10L 15/02 |
| 2018/0253490 A1 | 9/2018 | Saraclar et al. | |
| 2019/0355346 A1* | 11/2019 | Bellegarda | G06F 40/284 |

OTHER PUBLICATIONS

IBM, "System and method for effective vocabulary independant speech retrieval using inverted index with Boolean constraints," IP.com No. IPCOM000180111D, IP.com Electronic Publication Date: Mar. 4, 2009, 2 pages.

IBM, "Hybrid Speech to Speech translation system," IP.com No. IPCOM000191274D, IP.com Electronic Publication Date: Dec. 24, 2009, 3 pages.

Disclosed Anonymously,"Method and System for Recognizing Out-of-Vocabulary (OOV) Words using Spell and Recognize Acoustics-to-Word (A2W) Model," IP.com No. IPCOM000253078D, IP.com Electronic Publication Date: Mar. 2, 2018, 3 pages.

Long Qin and Alexander Rudnicky,"Building A Vocabulary Self-Learning Speech Recognition System," Interspeech, 2014, 5 pages.

Stefan Kombrink, Mirko Hannemann, Lukas Burget,"Out-of-vocabulary word detection and beyond," Brno University of Technology, 8 pages.

Long Qin, "Learning Out-of-VocabularyWords in Automatic Speech Recognition," Language Technologies Institute, 2013, 111 pages.

* cited by examiner

DETECTING AND RECOVERING OUT-OF-VOCABULARY WORDS IN VOICE-TO-TEXT TRANSCRIPTION SYSTEMS

BACKGROUND

The present invention relates to voice-to-text transcription systems, and more specifically, to identifying and recovering out-of-vocabulary words in voice data using text recognition models.

Voice-to-text systems are used in a variety of settings to convert audio content to textual content. For example, voice-to-text systems may be used to generate transcripts of spoken words in real-time for future reference or official records (e.g., transcripts of legal proceedings, meetings, etc.). In another example, voice-to-text systems may be used in real time to augment audio or audiovisual content, such as live television programs, with textual representations of the audio.

Generally, voice-to-text systems may be trained to generate a textual representation of audio content by mapping portions of the audio content to whole words. Depending on a size and the contents of the dictionary used train a voice-to-text system, a voice-to-text system may have difficulty accurately constructing transcripts of audio content. For example, if a voice-to-text system is trained on a small dictionary, a large number of words may not be accurately recognized. In another example, specialized, domain-specific words (e.g., scientific terms) may not be accurately recognized by voice-to-text systems trained using general knowledge dictionaries.

When a voice-to-text system encounters an out-of-vocabulary word, or a word or found in a dictionary used to train the voice-to-text system, the voice-to-text system can output a null string for the unknown word or attempt to output known words that sound like parts of the unknown word. Outputting the null string may cause information to be lost between the audio content and the textual representation of the audio content. Meanwhile, outputting known words that sound like parts of the unknown word may result in the generation of a nonsensical textual representation of the audio content.

SUMMARY

One aspect of the present disclosure provides a method for recovering out-of-vocabulary words in transcriptions of voice data. The method generally includes receiving a voice data recording for transcription into a textual representation of the voice data recording. The voice data recording is transcribed into the textual representation using a word recognition model. An unknown word is identified in the textual representation, and the unknown word is reconstructed based on recognition of sub-units of the unknown word generated by a sub-unit recognition model. The textual representation of the voice data recording is modified by replacing the unknown word with the reconstruction of the unknown word, and the modified textual representation is output.

Another aspect of the present disclosure provides a system having a processor and a memory. The memory generally has instructions stored thereon which, when executed by the processor, performs an operation for recovering out-of-vocabulary words in transcriptions of voice data. The operation generally includes receiving a voice data recording for transcription into a textual representation of the voice data recording. The voice data recording is transcribed into the textual representation using a word recognition model. An unknown word is identified in the textual representation, and the unknown word is reconstructed based on recognition of sub-units of the unknown word generated by a sub-unit recognition model. The textual representation of the voice data recording is modified by replacing the unknown word with the reconstruction of the unknown word, and the modified textual representation is output.

Still another aspect of the present disclosure provides a computer-readable medium having instructions stored thereon which, when executed by a processor, performs an operation for recovering out-of-vocabulary words in transcriptions of voice data. The operation generally includes receiving a voice data recording for transcription into a textual representation of the voice data recording. The voice data recording is transcribed into the textual representation using a word recognition model. An unknown word is identified in the textual representation, and the unknown word is reconstructed based on recognition of sub-units of the unknown word generated by a sub-unit recognition model. The textual representation of the voice data recording is modified by replacing the unknown word with the reconstruction of the unknown word, and the modified textual representation is output.

DETAILED DESCRIPTION

Out-of-vocabulary words in audio content generally adversely affect the accuracy and readability of transcripts produced by audio-to-text transcription systems. Because out-of-vocabulary words have a negative impact on the transcripts, various techniques have been developed to address the presence of out-of-vocabulary words in audio content. In one example, hybrid speech recognition systems can use various decoding outputs may be to compensate for the presence of out-of-vocabulary words and attempt to improve the accuracy and readability of transcripts. These outputs may include word confidence information and timing information, which may be used to identify the location and length of out-of-vocabulary words and attempt to recover these words. For example, speech recognition models may explicitly model out-of-vocabulary words using sub-word units or may use confidence scores produced by a speech recognition system to categorize text output into out-of-vocabulary and in-vocabulary regions. In other examples, end-to-end neural network based speech recognition systems, which use training and inference pipelines that may be simpler than those used in conventional speech recognition systems, may be used to identify and attempt to recover out-of-vocabulary words.

These systems, however, have limitations that decrease the performance of these systems in identifying and recovering out-of-vocabulary words in audio content. Systems that use a primary whole word-based recognition system and a character-based model for out-of-vocabulary recognition and recovery may rely on confidence scores generated by the whole word-based recognition system, which may result in the generation of a reserved unknown word token that ultimate invokes the character-based model for words that may actually be known to the whole word-based recognition system. Further, these systems may produce inaccurate timing information or no timing information for words in the audio content, which may degrade the performance of out-of-vocabulary word detection in speech recognition systems.

Aspects of the present disclosure provide efficient techniques for detecting and recovering out-of-vocabulary words in audio content. As discussed in further detail below, out-of-vocabulary words may be detected by determining whether a speech recognition system has reconstructed a whole word or as a collection of word pieces (e.g., phonetic segments, characters, etc.). If a speech recognition system has reconstructed a word as a collection of word pieces, the speech recognition system can deem the word to be an unknown word and attempt to recover the word from the word pieces. By using determinations of whether a word has been reconstructed as a whole word or a collection of word pieces, aspects discussed herein can bypass the use of confidence information to determine whether a word is in-vocabulary or out-of-vocabulary. A speech recognition system can additionally or alternatively use whole word sequence-to-sequence systems, such as attention-based models, to identify in-vocabulary and out-of-vocabulary words and use character outputs in regions overlapping with an out-of-vocabulary word to reconstruct the out-of-vocabulary word.

Figure 1:
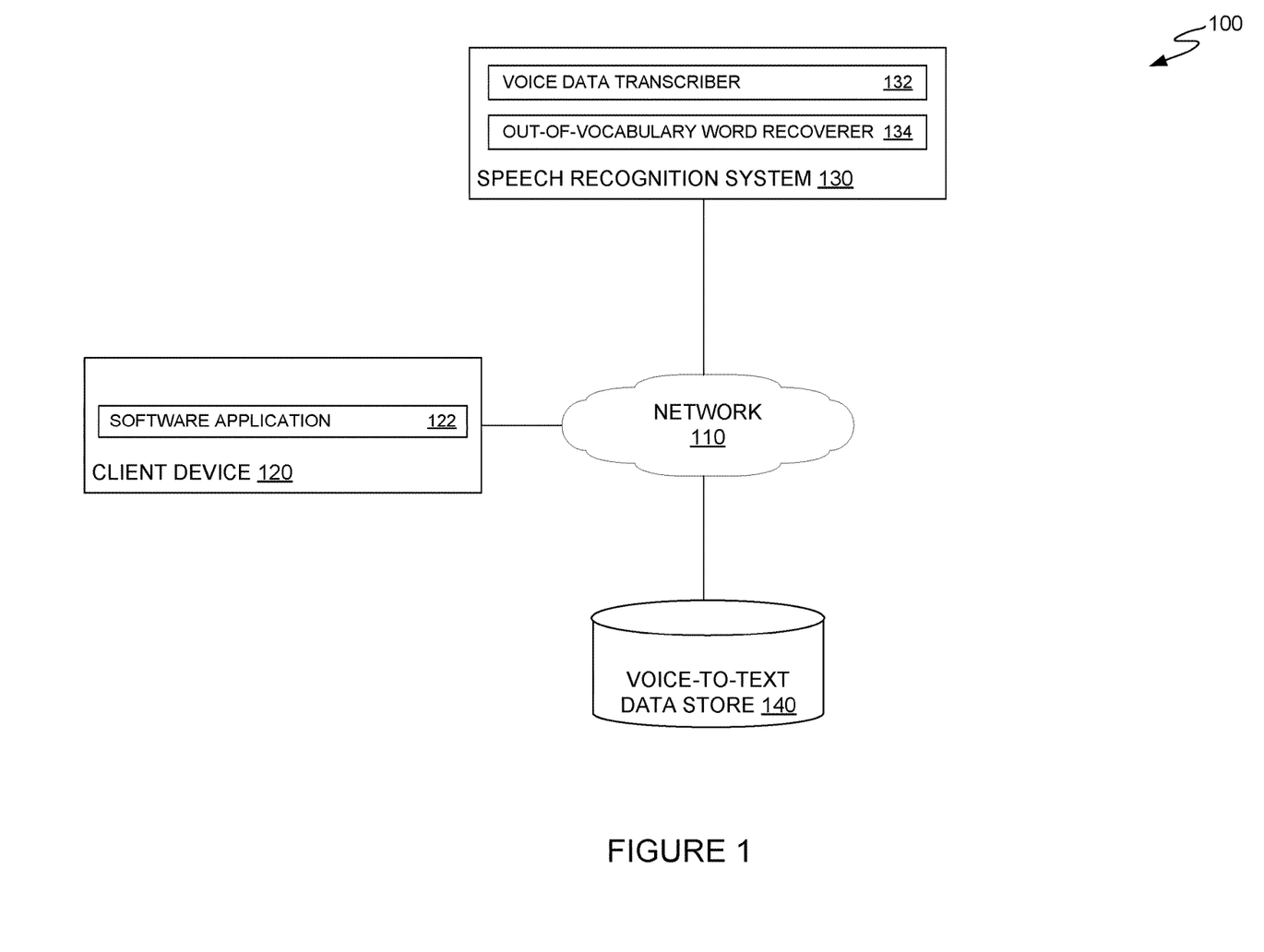
FIG. 1 illustrates a networked computing environment in which audio content is transcribed into textual representations using a first text recognition model, and unknown words in the textual representation are recovered using a second text recognition model, according to an embodiment.

FIG. 1 illustrates an example networked computing environment in which whole word and word piece recognition models are used to identify and recover out-of-vocabulary words in transcriptions of audio content, according to an embodiment of the present disclosure. As illustrated, computing environment 100 includes a client device 120, a speech recognition system 130, and a voice-to-text data store 140.

Client device 120 is generally representative of computing devices on which a user can access audiovisual content and receive, from speech recognition system 130, textual representations of the audiovisual content for display. As illustrated, client device 120 includes a software application 122.

Software application 122 generally provides an interface through which a user can access audiovisual content from a remote source and invoke speech recognition and transcript generation operations at speech recognition system 130. In some embodiments, software application 122 may provide a mechanism for a user of client device 120 to upload a previously recorded audiovisual file to and retrieve a transcript of the recorded audiovisual file from speech recognition system 130. In some embodiments, software application 122 may be a web browser or other application that allows a user to interact with speech recognition system 130.

Speech recognition service 130 receives audiovisual content and uses word and word sub-unit (or word piece) recognition models to generate a transcript of the audiovisual content and output the transcript to client application for display and/or to a data store (e.g., voice-to-text data store 140) for future retrieval. As illustrated, speech recognition system 130 includes a voice data transcriber 132 and an out-of-vocabulary word recoverer 134.

Voice data transcriber 132 generally processes received audiovisual content through a word recognition model and a sub-unit recognition model to generate a textual representation of audio content, such as a voice data recording or an audiovisual file including a voice data track. The models used by voice data transcriber 132 may be trained by a remote system (not shown) and deployed to speech recognition system 130 for use in generating transcripts of voice data recordings, and these models may be periodically updated to improve the accuracy of transcripts generated using these models. In some embodiments, the word recognition model may be trained using a training data set of whole words and word sub-units, such as phonetic units or portions of whole words. As discussed in further detail below, where the word recognition model is trained using a training data set of whole words and word sub-units, generation of a plurality of word sub-units for a given portion of a voice data recording may be used as an indication that the given portion of the voice data recording corresponds to an out-of-vocabulary word. The word sub-unit recognition model may be trained using a training data set of word parts, such as phonetic units, portions of words (e.g., syllables), characters, or other constituent parts of words that may be included in a voice data recording. The output of the word sub-unit recognition model may be used to recover an out-of-vocabulary word, as discussed in further detail below.

The word recognition model and word sub-unit recognition model may be implemented as neural networks configured to map an audio representation of a word (or a portion of a word) to a corresponding textual representation of the word (or a portion of the word). In some embodiments, where the word recognition model and word sub-unit recognition model are connectionist temporal classification models, the word recognition model may be configured to map a portion of a voice data recording a word or a word sub-unit, and the sub-unit recognition model may be configured to map the portion of the voice data recording to one or more phonetic or syllabic word sub-units that can be concatenated with other word sub-units to recover an out-of-vocabulary word. In some embodiments, where the word recognition model and word sub-unit recognition model are sequence-to-sequence models, the word recognition model may be configured to output timing information and map a portion of a voice data recording either to a whole word or a reserved sequence indicating that a word is unknown to the word recognition model, and the word sub-unit recognition model may be configured to map a portion of a voice data recording to one or more characters and output timing information for each character recognized in the voice data recording.

Voice data transcriber 132 generally receives a voice data recording as an audio file or an audio track in an audiovisual file and transcribes the voice data recording into a textual representation of the voice data recording. To transcribe the voice data recording to the textual representation, voice data transcriber 132 can input the voice data recording into a word recognition model that generates a textual output for a given audio input. As discussed above, the word recognition model may be a neural network configured to map information in a voice data recording to individual whole words or portions of words based, for example, on a confidence associated with mappings of portions of the voice data recording to words or word parts in a universe of words and word parts used to train the word recognition model. For example, the word recognition model may generate a probability distribution over the universe of words and word parts used to train the word recognition model and select the word or word part having the highest probability in the probability distribution as the word or word part corresponding to each portion of the voice data recording.

For a word recognition model that is structured as a connectionist temporal classification model, the word recognition model may result in portions of a voice data recording being mapped to whole words or word pieces, such as phonetic segments, syllable components of a word, or the like. Generally, mapping of a portion of a voice data recording to a whole word may indicate that the word recognition model recognized the portion of the voice data recording as an in-vocabulary word, while mapping of the portion of the voice data recording to a word piece may indicate that the word recognition model recognized the portion of the voice data recording (and other adjacent portions of the voice data recording) as an out-of-vocabulary word. To determine whether a portion of a voice data recording has been mapped to a whole word or a word part, voice data transcriber 132 can search a dictionary for an exact match to each word or word part mapped to portions of the voice data recording. Groupings of consecutive word parts, which may not exist in the dictionary, may thus correspond to out-of-vocabulary words for out-of-vocabulary word recoverer 134 to reconstruct, as discussed below.

For a word recognition model that is structured as a sequence-to-sequence model, the word recognition model may generate an in-vocabulary word for portions of a voice data recording that map to recognized words in a dictionary used to train the sequence-to-sequence model. In contrast, a reserved sequence of characters or reserved word sub-unit may be generated for a portion of a voice data recording that does not map to a recognized word in the dictionary. The reserved sequence of characters or reserved word sub-unit, such as "<UNK>", may indicate to out-of-vocabulary word recoverer 134 a general location of an out-of-vocabulary word to be reconstructed from a sequence-to-sequence model trained to recognize individual characters in a voice data recording, as discussed in further detail below.

Out-of-vocabulary word recoverer 134 generally receives a transcript of a voice data recording from voice data transcriber 132 and reconstructs out-of-vocabulary words identified by a word recognition model using a corresponding word sub-unit recognition model. The techniques used by out-of-vocabulary word recoverer 134 may differ based on whether the word recognition model and word sub-unit recognition model are connectionist temporal classification models, sequence-to-sequence models, or other language recognition models that may be used to transcribe a voice data recording to a textual representation of the voice data recording.

For a word recognition model that is structured as a connectionist temporal classification model, each out-of-vocabulary word identified in a transcript of a voice data recording may be defined as a sequence of consecutive word sub-units or parts bounded by a preceding recognized whole word and a succeeding recognized whole word. To recover an out-of-vocabulary word, out-of-vocabulary word recoverer 134 is generally configured to use a word sub-unit recognition model that is also structured as a connectionist temporal classification model and trained to map portions of voice data recordings to word sub-units, such as phonetic segments, word syllables, or the like Out-of-vocabulary word recoverer 134 can identify the word sub-unit segments generated by the word sub-unit recognition model corresponding to the out-of-vocabulary word in the transcript and concatenate the word sub-units together into one or more groups of word sub-units and reconstruct words from the one or more groups of word sub-units. In some embodiments, where the word sub-units are phonetic segments, out-of-vocabulary word recoverer 134 can search a reverse phonetic dictionary to reconstruct a word from each grouping of phonetic segments. In other embodiments, where the word sub-units are syllables or other non-phonetic word sub-units, out-of-vocabulary word recoverer 134 can concatenate the word sub-units in a group into a single string and search a dictionary for potential matches to the string. Out-of-vocabulary word recoverer 134 can use fuzzy matching techniques, such as those used in computer-based spelling correction mechanisms, to identify likely matches to the string as the word corresponding to the group of word sub-units. After identifying a word from a group of word sub-units, out-of-vocabulary word recoverer 134 can replace the group of word sub-units in the transcript generated by voice data transcriber 132 with the identified word, thus recovering an out-of-vocabulary word in the voice data recording with an accurate representation of the out-of-vocabulary word.

In embodiments where the word recognition model is a sequence-to-sequence model, an out-of-vocabulary word, and the special sequence of characters identifying the out-of-vocabulary word as an unknown word in the transcript generated by voice data transcriber 132, may be accompanied by an attention peak. The attention peak may be a timestamp in the voice data recording around which the unknown, out-of-vocabulary word was located. A word sub-unit recognition model, which may be a sequence-to-sequence model configured to recognize individual characters in a voice data recording, may be used to recover an out-of-vocabulary word on a per-character basis. To identify the characters that correspond to the out-of-vocabulary word, out-of-vocabulary word recoverer 134 can use the attention peak associated with the out-of-vocabulary word to identify likely boundaries of the word in the voice data recording provided to speech recognition system 130 for analysis. The boundaries of the word may be defined based on the identification of whitespace characters within the voice data recording, where the first character of a word is identified immediately after a whitespace character and the last character of the word is identified immediately before the next whitespace character in the voice data recording. In some embodiments, surrounding context may also or alternatively be used to identify the characters associated with an out-of-vocabulary word in the voice data recording. For example, information about the characters that are included in words preceding and succeeding the out-of-vocabulary word may be used to identify the boundaries of the out-of-vocabulary word in a character-by-character transcription of the voice data recording generated by the word sub-unit recognition model.

Generally, each character recognized in the voice data recording by the word sub-unit recognition model may be accompanied by a corresponding attention peak in the model. Out-of-vocabulary word recoverer 134 can generate a string by concatenating the characters associated with each attention peak in the model between whitespace or other boundary characters identified for the out-of-vocabulary word. The string generated by out-of-vocabulary word recoverer 134 may replace the reserved sequence of characters for the corresponding unknown word in the transcript of the voice data recording.

After out-of-vocabulary word recoverer 134 modifies a transcript of a voice data recording by replacing sequences associated with out-of-vocabulary words with reconstructions of the out-of-vocabulary words using a word sub-unit recognition model, out-of-vocabulary word recoverer 134 outputs the modified transcript. In some embodiments, the modified transcript may be output for display in software application 122 executing on client device 120 in real-time or near-real-time with the audiovisual content from which the transcript was generated. In some embodiments, the modified transcript may be committed to voice-to-text data store 140 for future reference.

In some embodiments, where speech recognition system 130 uses connectionist temporal classification word recognition and word sub-unit recognition models, interpolation weights associated with these models may be adjusted to control a likelihood that words will be recognized as out-of-vocabulary words. Higher interpolation weights associated with the word sub-unit recognition model may increase the number of words that are recognized as out-of-vocabulary words and reconstructed from word sub-units (e.g., phonetic units, syllabic units, etc.), which may reduce the precision of the system while increasing a likelihood that words can be recalled using the word sub-unit analysis and reconstruction techniques discussed above. Similarly, lower interpolation weights associated with the word sub-unit recognition model may decrease the number of words that are recognized as out-of-vocabulary words, which may reduce the number of times that a word is reconstructed from word sub-units, at the expense of recognition accuracy.

Voice-to-text data store 140 generally serves as a repository for transcripts generated by speech recognition system 130. In some embodiments, voice-to-text data store may additionally include training data sets of words and word sub-units that can be used to train the word recognition models and word sub-unit recognition models used by speech recognition system 130 to generate transcripts from voice data recordings and recover out-of-vocabulary words in the generated transcripts, as discussed above.

Figure 2:
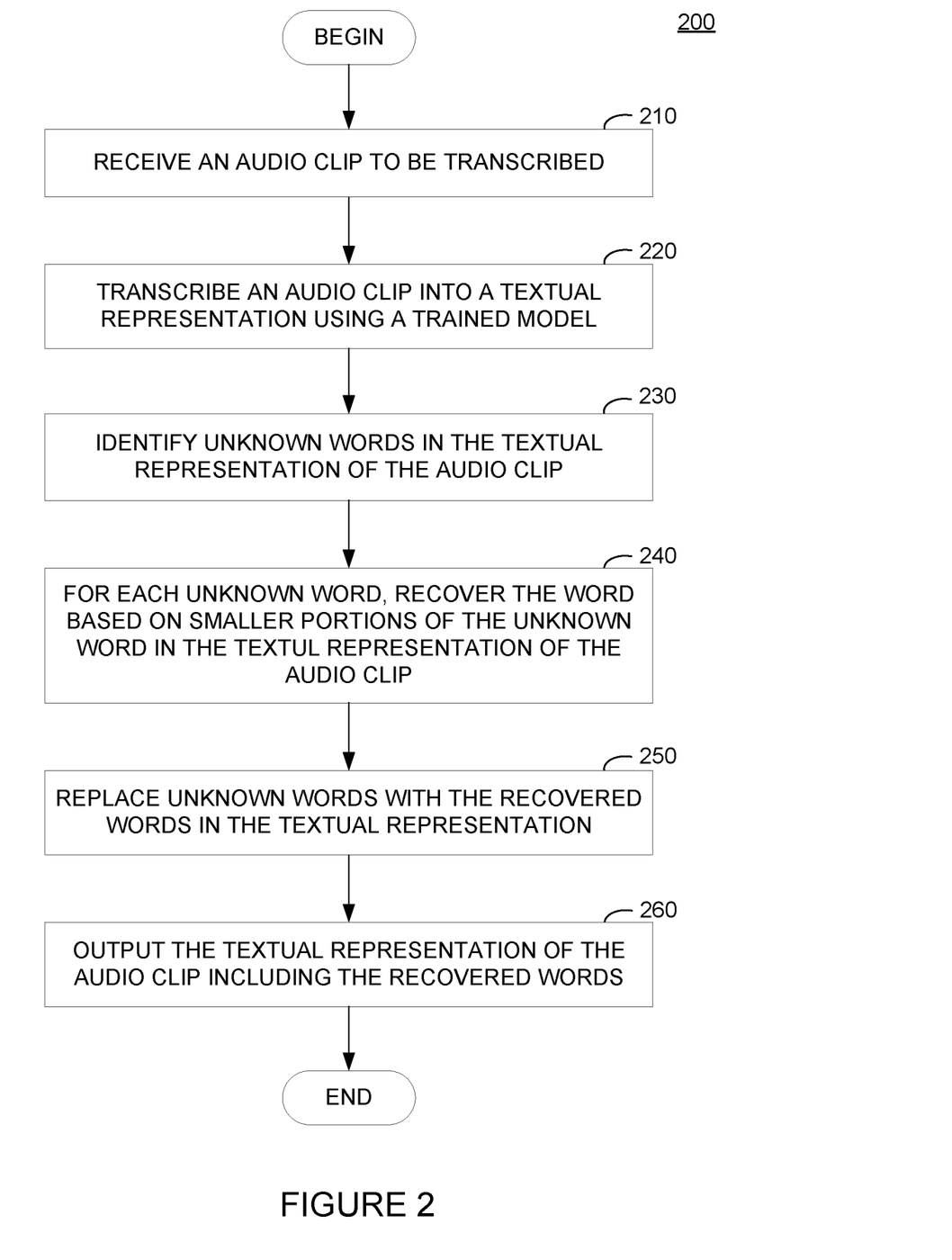
FIG. 2 illustrates example operations for generating a textual representation of audio content using a first text recognition model and recovering out-of-vocabulary words in the generated textual representation using a second text recognition model, according to an embodiment.

FIG. 2 illustrates example operations that may be performed by a speech to text system (e.g., speech recognition system 130 illustrated in FIG. 1) to generate a transcript of a voice data recording and recover out-of-vocabulary words in the transcript using a word recognition model and a word sub-unit recognition model, according to an embodiment. As illustrated, operations 200 begin at block 210, where a system receives an audio clip to be transcribed. As discussed, the audio clip may be a voice data recording that does not include any other content, an audio track from an audiovisual file, an audiovisual file from which audio content can be extracted, or the like.

At block 220, the system transcribes the audio clip into a textual representation using a trained model. As discussed, the system can transcribe the audio clip using a word recognition model. The model may be, for example, a connectionist temporal classification model trained against a data set of whole in-vocabulary words and a variety of word sub-units such that in-vocabulary words in the audio clip are mapped to whole words from the data set while out-of-vocabulary words in the audio clip are mapped to a plurality of word sub-units to signify that the corresponding portion of the audio clip does not include a recognized word in the data set. In another example, the model may be a sequence-to-sequence model trained against a data set of in-vocabulary words such that in-vocabulary words in the audio clip are mapped to whole words from the data set and out-of-vocabulary words are mapped to a special or reserved sequence of characters indicating that a word was unable to be mapped to the corresponding portion of the audio clip.

At block 230, the system identifies unknown words in the textual representation of the audio clip. As discussed, the system can identify unknown words in the audio clip by identifying mappings of portions of an audio clip to word sub-units (e.g., phonetic units, syllables, characters, etc.) or to a special or reserved sequence of characters.

At block 240, for each unknown word identified in the textual representation of the audio clip, the system recovers the word based on smaller portions of the unknown word in the textual representation of the audio clip. Recovery of an unknown, out-of-vocabulary word based on smaller recognized portions of the unknown word may be based on the type of model used to recognize words in the audio clip, as discussed above. In some embodiments, recovery of the unknown word may be based on concatenation of phonetic or syllabic word sub-units and dictionaries mapping these concatenations into likely words or character strings. In other embodiments, recovery of the unknown word may be based on character timing information for characters recognized around a timestamp associated with the unknown word in the audio clip.

At block 250, the system replaces unknown words in the textual representation of the audio clip with the recovered words.

At block 260, the system outputs the textual representation of the audio clip including the recovered words. In some embodiments, the system can output the textual representation to a local or remote system for display on a device connected with or integral thereto. In some embodiments, the system can output the textual representation to be persisted to a data store for future reference.

Figure 3:
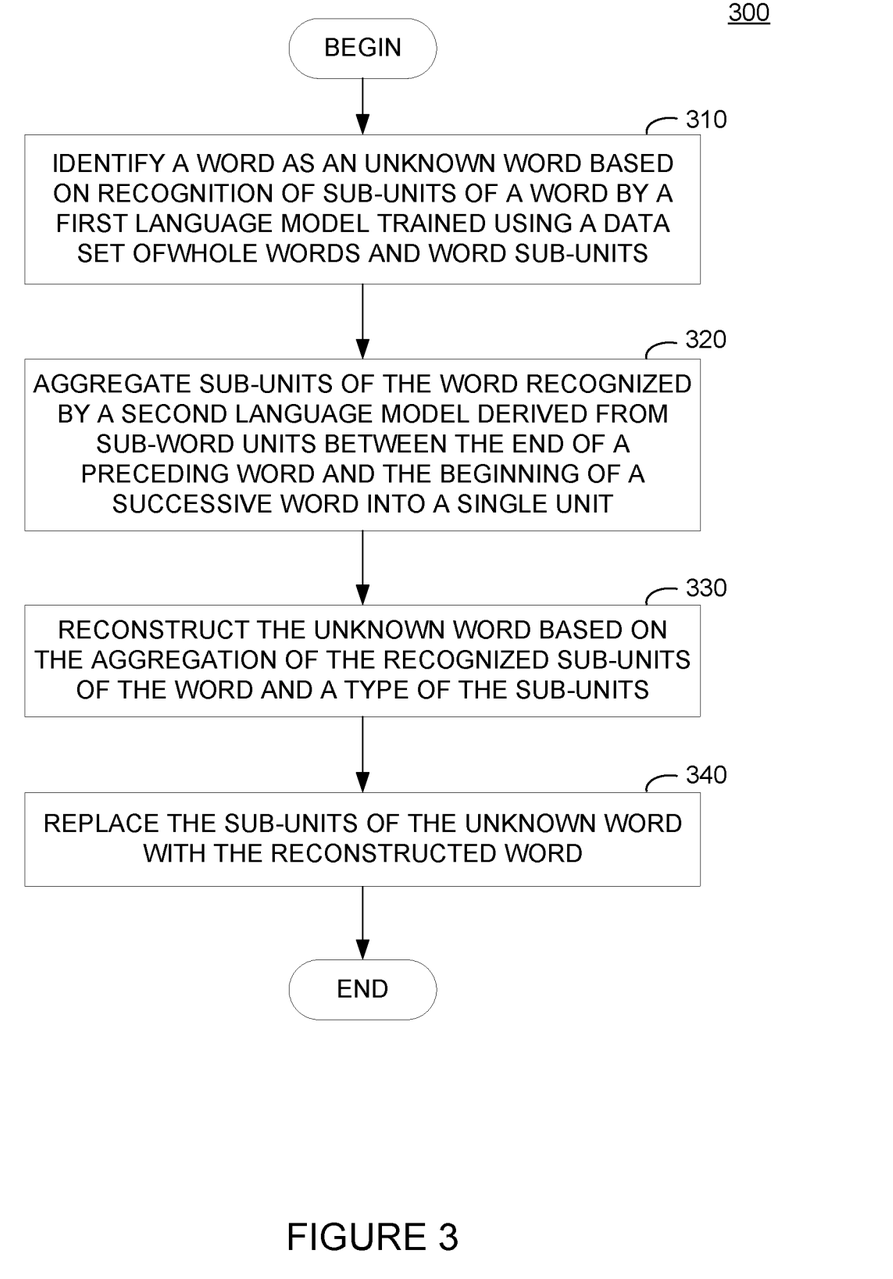
FIG. 3 illustrates example operations for recovering out-of-vocabulary words using connectionist temporal classification (CTC) text recognition models, according to an embodiment.

FIG. 3 illustrates example operations that may be performed by a speech recognition system for recovering out-of-vocabulary words in a voice data recording based on connectionist temporal classification word recognition and word sub-unit recognition models, according to an embodiment. As illustrated, operations 300 may begin at block 310, where the speech recognition system identifies a word as an unknown word based on recognition of sub-units of a word by a first language model trained using a data set of whole words and word sub-units. As discussed, in-vocabulary words may be mapped by the first language model (i.e., a word recognition model) to whole words, or words that appear in a dictionary of words, and out-of-vocabulary words may be mapped by the first language model to word sub-units. To identify a word as an unknown word, the speech recognition system can identify sequences of word sub-units between whole words in a transcript of a voice data recording generated by the first language model. A sequence of word sub-units located between whole words may be considered a sequence corresponding to an out-of-vocabulary word in the voice data recording, and a word may be recovered for the sequence using a second language model (i.e., a word sub-unit recognition model).

At block 320, the speech recognition system aggregates (or synthesizes) sub-units of a word generated by a second language model (which may execute separately or in parallel to the first language model) into a single unit. The second language model may be a word sub-unit recognition unit trained to map portions of a voice data recording to phonetic or syllabic units of words, as discussed above. To identify the sub-units in a transcript of the voice data recording to combine into a single unit corresponding to the unknown word, the system can attempt to identify a starting location for the single unit based on the location of the last whole word recognized by the first language model and the next whole word recognized by the first language model. Word subunits between the last whole word and the next whole word may be considered components of an out-of-vocabulary word and may be concatenated to generate a single unit for analysis.

At block 330, the speech recognition system reconstructs the unknown word based on the aggregation of the recognized sub-units of the word into the single unit and a type of the sub-units. For example, where the sub-units recognized at block 320 comprise phonetic representations of a word, the speech recognition system can concatenate strings defining the phonetic representations of each of a plurality of word sub-units into a single phonetic string. The speech to text recognition service can use a dictionary and the single unit including the recognized sub-units to concatenate the recognized sub-units into a phonetic representation and search the phonetic representation of the dictionary to identify the definition of any given word recognized by the speech recognition system.

In contrast, where the text-to-speech recognition system is trained to reconstruct a previously unknown word using per-syllable recognition may combine the recognized syllables into a single unit. The speech recognition system can search for information about any given reconstructed word. For example, where the text-to-speech recognition system reconstructs unknown words based on a concatenation of syllabic word sub-units, the speech recognition system can post-process the concatenated unit against a known dictionary to improve the accuracy of the words recognized in a voice data recording and output to a user of the speech recognition system.

At block 340, the speech recognition system replaces the sub-units of the unknown word with the reconstructed word. The system can replace these subunits using various string replacement operations. Once replaced, the system can output the textual representation of the voice data recording, including the recovered words, to a client device 120 for display and/or persist the textual representation to voice-to-text data store 140 for future reference.

Figure 4:
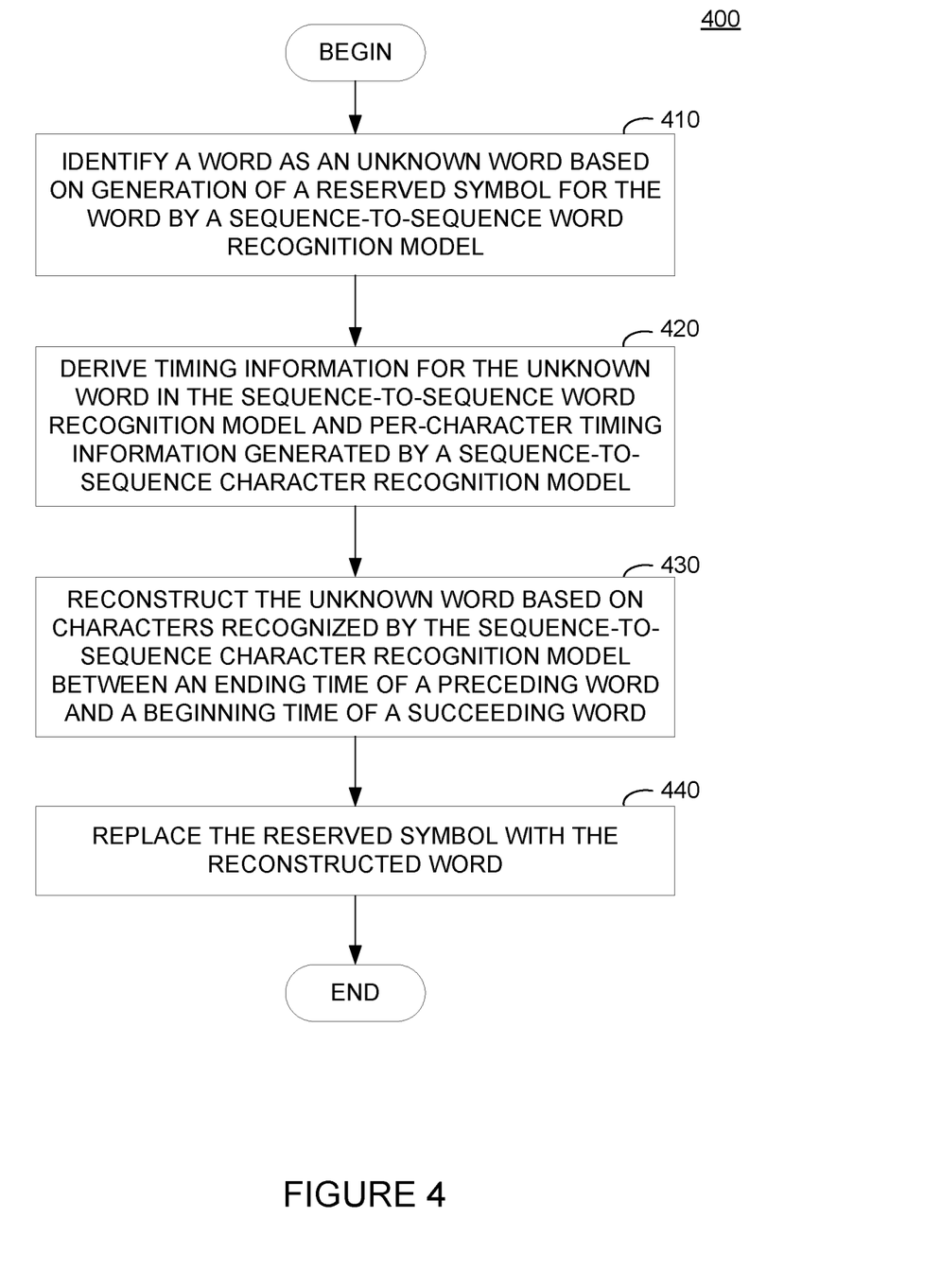
FIG. 4 illustrates example operations for recovering out-of-vocabulary words using sequence-to-sequence text recognition models, according to an embodiment.

FIG. 4 illustrates example operations that may be performed by a speech recognition system to recover out-of-vocabulary words in a text representation of a voice data recording using a first sequence-to-sequence language model configured to recognize whole words in the voice data recording and a second sequence-to-sequence language model configured to recognize individual characters of words in the voice data recording, according to an embodiment. As illustrated, operations 400 may begin at block 410, where the speech recognition system identifies a word as an unknown word based on the generation of a reserved symbol for the word by a sequence-to-sequence word recognition model. As discussed, the word recognition model may map portions of a voice data recording to whole words that exist within the training data set used to train the word recognition model. Correspondingly, the word recognition model may map portions of a voice data recording to a special or reserved sequence of characters indicating that a word is an out-of-vocabulary word.

At block 420, the speech recognition system derives timing information for the unknown word in the sequence-to-sequence word recognition model and per-character timing information generated by a sequence-to-sequence character recognition model. The timing information for the unknown word may be a singular attention peak identified between other attention peaks corresponding to recognized or out-of-vocabulary words in the voice data recording. The per-character timing information generated by the sequence-to-sequence character recognition model may be used to identify the characters recognized around a timestamp associated with the attention peak for the unknown word in the word recognition model. Generally, the per-character timing information may be used to identify whitespace or pause characters that separate individual words in a spoken representation of these words, as well as when individual characters are recognized by the word sub-unit recognition model.

At block 430, the speech recognition system reconstructs the unknown word based on characters recognized by the sequence-to-sequence character recognition model. The recognized characters, as discussed, may be associated with attention peaks that are between the whitespace characters bounding the attention peak of the unknown word generated by the word recognition system.

At block 440, the system replaces the reserved symbol with the reconstructed word. By replacing the reserved symbol with the reconstructed word, the speech recognition system can improve the accuracy of transcripts of audio data generated by the speech recognition system.

Figure 5:
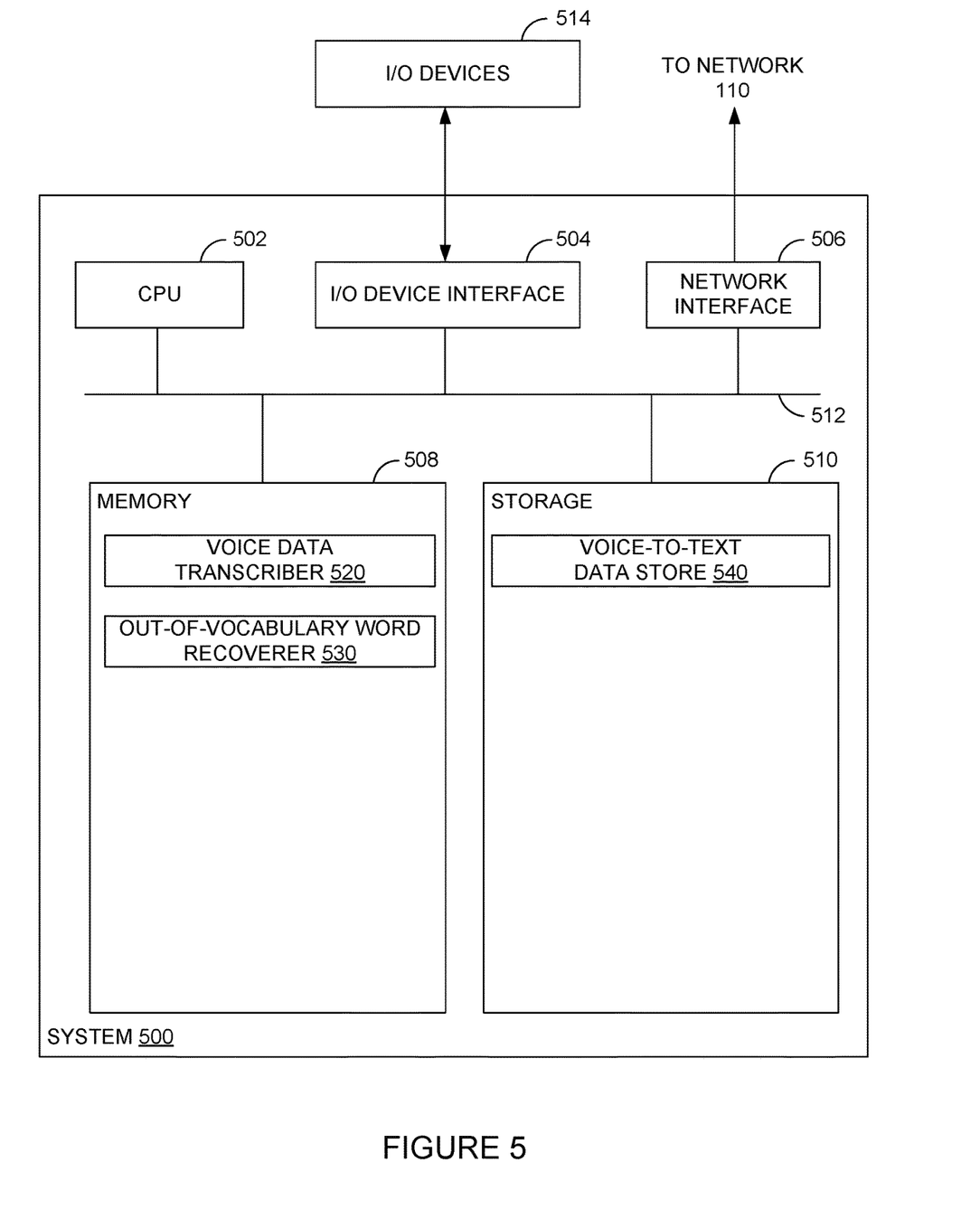
FIG. 5 illustrates an example system in which aspects of the present disclosure may be performed.

FIG. 5 illustrates an example system 500 that uses a word recognition model and a word sub-unit recognition model to identify out-of-vocabulary words in a voice data recording and recover the identified out-of-vocabulary words for inclusion in a textual representation of the voice data recording, according to an embodiment. As illustrated, system 500 includes, without limitation, a central processing unit 502, one or more I/O device interfaces 505, which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, storage 510 may be a disk drive, a solid state drive, a phase change memory device, or the like. Although shown as a single unit, the storage 510 may be a combination of fixed and/or removable storage devices, such as fixed disc drives, solid state drives, removable memory cards or optical storage, network attached storage (NAS), or a storage area network (SAN).

As illustrated, memory 508 includes a voice data transcriber 520 and an out-of-vocabulary word recoverer 530. Voice data transcriber 520 is generally configured to generate an initial transcript of a voice data recording using a word recognition model that is configured to recognize out-of-vocabulary words as a collection of word parts or map out-of-vocabulary words in the voice data recording to a reserved sequence of characters indicating that a word was unable to be recognized. Out-of-vocabulary word recoverer 530 can examine the transcripts of the voice data recording generated by voice data transcriber 520 to identify sequences of word sub-units (e.g., phonetic units, syllables, characters, etc.) or inclusion of the reserved sequence of characters indicative of an out-of-vocabulary word. Using combinations of word sub-units corresponding to the out-of-vocabulary word, out-of-vocabulary word recoverer 530 can generate a replacement string representing the out-of-vocabulary word and replace the word sub-units or reserved sequence of characters with the replacement string.

Storage 510, as illustrated, includes a voice-to-text data store 540. Voice-to-text data store 540 is generally illustrative of a data store in which transcripts of voice data recordings may be stored. In some embodiments, voice-to-text data store may also store the dictionaries used to train the word recognition model and word sub-unit recognition models used in identifying and recovering out-of-vocabulary words in a voice data recording, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for recovering out-of-vocabulary words in transcriptions of a voice data recording, comprising:
   receiving a voice data recording for transcription into a textual representation of the voice data recording;
   transcribing the voice data recording into the textual representation using a word recognition model, wherein the word recognition model comprises a connectionist temporal classification model trained using a training data set of whole words and sub-words;
   identifying an unknown word in the textual representation;
   reconstructing the unknown word in the textual representation based on recognition of sub-units of the unknown word generated by a sub-unit recognition model, wherein the sub-unit recognition model comprises a connectionist temporal classification model trained using sub-words;
   modifying the textual representation of the voice data recording by replacing the unknown word with the reconstruction of the unknown word; and
   outputting the modified textual representation of the voice data recording.

2. The method of claim 1, wherein the sub-units comprise phonetic components of words, and wherein reconstructing the unknown word comprises:
   synthesizing the recognized sub-units into a single unit bounded by an ending time of a word preceding the unknown word and a beginning time of a word succeeding the unknown word; and
   looking up the unknown word using the single unit and a reverse phonetic dictionary.

3. The method of claim 1, wherein the sub-units comprise pieces from which a word can be constructed, each piece including a beginning of word symbol and end of word symbol, and wherein reconstructing the unknown word comprises combining the recognized sub-units into a single unit by connecting an end of word symbol of each respective sub-unit to a beginning of word symbol of a succeeding sub-unit.

4. The method of claim 1, wherein identifying the unknown word in the textual representation comprises determining that the word recognition model has output a sub-word unit for a segment in the voice data recording.

5. The method of claim 1, further comprising adjusting an interpolation weight of the word recognition model to adjust a preference for generating the textual representation using whole words or sub-words.

6. A method for recovering out-of-vocabulary words in transcriptions of a voice data recording, comprising:
   receiving a voice data recording for transcription into a textual representation of the voice data recording;
   transcribing the voice data recording into the textual representation using a word recognition model, wherein the word recognition model comprises a sequence-to-sequence model trained using a training data set of whole words;
   identifying an unknown word in the textual representation;
   reconstructing the unknown word in the textual representation based on recognition of sub-units of the unknown word generated by a sub-unit recognition model, wherein the sub-unit recognition model comprises a sequence-to-sequence model trained using a training data set of sub-words;
   modifying the textual representation of the voice data recording by replacing the unknown word with the reconstruction of the unknown word; and
   outputting the modified textual representation of the voice data recording.

7. The method of claim 6, wherein identifying the unknown word in the textual representation comprises identifying a reserved sub-unit in the textual representation indicating that the word recognition model has identified the unknown word as an out-of-vocabulary word.

8. The method of claim 6, wherein reconstructing the unknown word comprises:
   identifying a starting time and ending time for the unknown word in the voice data recording based on attention peaks of a whitespace sub-unit preceding a time spike associated with the unknown word and a whitespace sub-unit succeeding the time spike associated with the unknown word; and constructing a word based on sub-units recognized by the sub-unit recognition model at each time spike between the whitespace sub-unit preceding the time spike associated with the unknown word and the whitespace sub-unit succeeding the time spike associated with the unknown word.

9. A system, comprising:

a processor; and a memory having instruction stored thereon which, when executed by the processor, performs an operation for recovering out-of-vocabulary words in transcriptions of a voice data recording, the operation comprising:

receiving a voice data recording for transcription into a textual representation of the voice data recording;

transcribing the voice data recording into the textual representation using a word recognition model, wherein the word recognition model comprises a connectionist temporal classification model trained using a training data set of whole words and sub-words;

identifying an unknown word in the textual representation;

reconstructing the unknown word in the textual representation based on recognition of sub-units of the unknown word generated by a sub-unit recognition model, wherein the sub-unit recognition model comprises a connectionist temporal classification model trained using sub-words;

modifying the textual representation of the voice data recording by replacing the unknown word with the reconstruction of the unknown word; and outputting the modified textual representation of the voice data recording.

10. The system of claim 9, wherein the sub-units comprise phonetic components of words, and wherein reconstructing the unknown word comprises:

synthesizing the recognized sub-units into a single unit bounded by an ending time of a word preceding the unknown word and a beginning time of a word succeeding the unknown word; and looking up the unknown word using the single unit and a reverse phonetic dictionary.

11. The system of claim 9, wherein the sub-units comprise pieces from which a word can be constructed, each piece including a beginning of word symbol and end of word symbol, and wherein reconstructing the unknown word comprises combining the recognized sub-units into a single unit by connecting an end of word symbol of each respective sub-unit to a beginning of word symbol of a succeeding sub-unit.

12. The system of claim 9, wherein identifying the unknown word in the textual representation comprises determining that the word recognition model has output a sub-word unit for a segment in the voice data recording.

13. The system of claim 9, wherein the operation further comprises adjusting an interpolation weight of the word recognition model to adjust a preference for generating the textual representation using whole words or sub-words.

* * * * *